United States Patent Office.

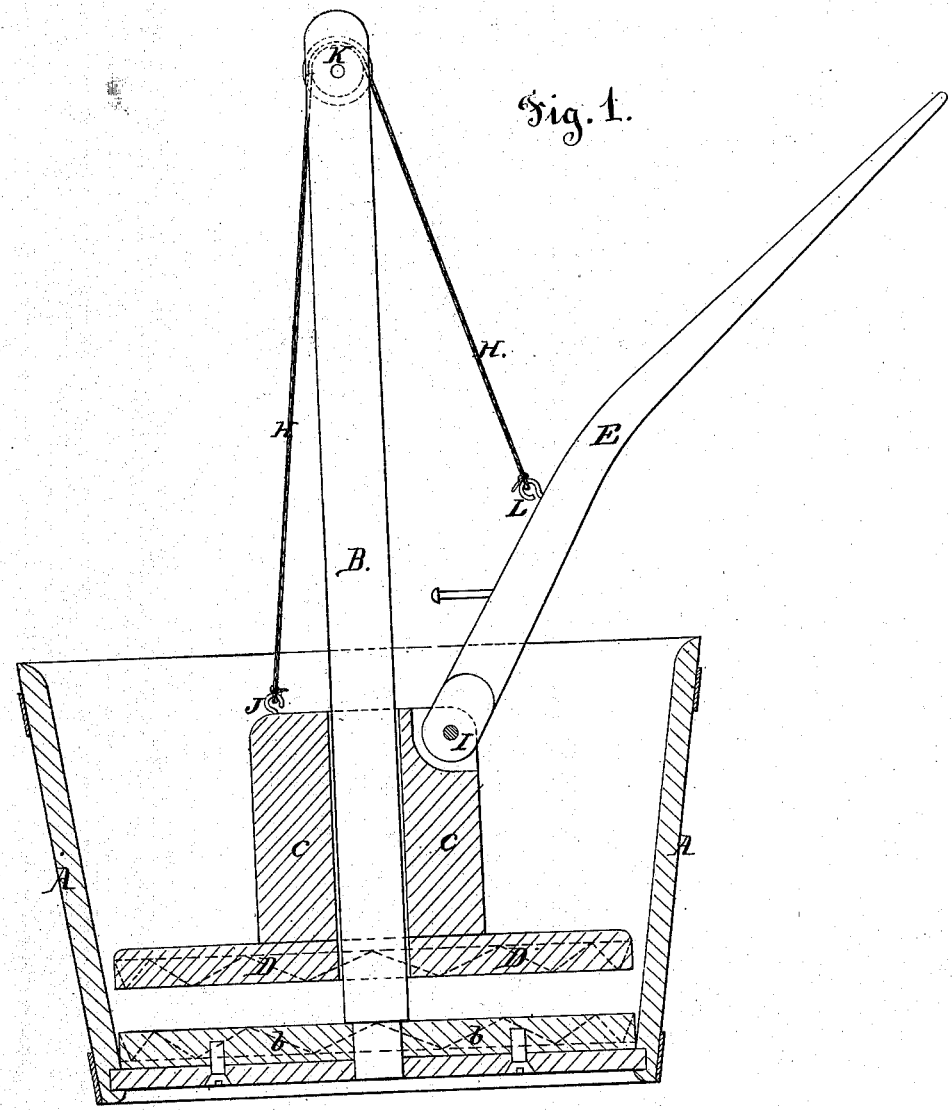

JOHN T. BEVER, OF LATHROP, MISSOURI.

Letters Patent No. 107,652, dated September 27, 1870.

IMPROVEMENT IN WASHING-MACHINES.

The Schedule referred to in these Letters Patent and making part of the same.

*To all whom it may concern:*

Be it known that I, JOHN T. BEVER, of the town of Lathrop, in the county of Clinton and State of Missouri, have invented a new and useful Improvement in Washing-Machines; and I do hereby declare that the following is a full, clear, and exact description thereof, reference being had to the accompanying drawing making a part of this specification, of which—

Figure 1 represents a perspective side view of the ordinary wash-tub, with my improvement attached thereto.

A represents an ordinary wash-tub, to which my device is especially adapted.

$b$ is a rubber attached to or made permanent in the bottom of the tub A.

D is a corresponding upper rubber, as will be hereinafter more fully explained.

B is a stem or upright, passing centrally up through the bottom of the tub and lower rubber $b$, and made securely fast to the same.

$c\ c$ is a cylinder or hub, passing down over the stem B, moving freely upon the same.

D represents the upper rubber, as before stated, and is made fast to the cylinder or hub $c\ c$, with tenon or screws.

E is a lever pivoted in hub $c\ c$ at $i$.

H H is a pulley-cord, starting at the opposite corner of hub $c\ c$ at J, and passing up through the pulley K at the top of the stem B, thence down to the ring or hook L on lever E.

Thus it will readily be seen that, by a gentle depression and elevation of the lever E, the vertical movement of rubber D is easily obtained, and, by an oscillating movement of said lever E, the partial rotary is readily called to facilitate the labor of more effectually cleansing the fabric.

Having thus described my invention,

What I claim as new, and desire to secure by Letters Patent, is—

The stem B, having pulley-wheel K affixed to the top, or its equivalent, in combination with cord H H, when said cord is attached to hub $c\ c$, and to lever E, substantially as described, and for the purposes set forth.

JOHN T. BEVER.

Witnesses:
J. D. POWERS,
W. I. BEVER.